Dec. 17, 1968   S. E. TOWNSEND   3,416,865
OPTICAL DENSITY MEASURING SYSTEM
Filed Nov. 27, 1964   3 Sheets-Sheet 1

INVENTOR.
STEPHEN E. TOWNSEND

Dec. 17, 1968  S. E. TOWNSEND  3,416,865
OPTICAL DENSITY MEASURING SYSTEM
Filed Nov. 27, 1964  3 Sheets-Sheet 3

INVENTOR.
STEPHEN E. TOWNSEND
BY
ATTORNEY

United States Patent Office 3,416,865
Patented Dec. 17, 1968

3,416,865
OPTICAL DENSITY MEASURING SYSTEM
Stephen E. Townsend, Rochester, N.Y., assignor to Xerox Corporation, Rochester, N.Y., a corporation of New York
Filed Nov. 27, 1964, Ser. No. 414,374
4 Claims. (Cl. 356—206)

ABSTRACT OF THE DISCLOSURE

An optical density measuring system in which a light source is maintained at a constant illumination intensity and utilized to energize a pair of photocells, the outputs of which are compared and upon detection of a variation in the respective signal levels as the result of a sample interrupting at least some of the light to one of the photocells, a light blocking member is adjusted to maintain the same intensity of light at each of the photocells. The density of samples thus tested is indicated as a function of the displacement of the light blocking member.

This invention relates to an optical-electric system for analyzing mediums with respect to variations in light transmission characteristics, and particularly to a method and means of measuring the optical density of objects over an extended range.

In the prior art optical density measuring systems for use with photocells or the like, a balance is maintained between the light intensity in two separate light paths. Usually, a sample workpiece of an unknown density is positioned in one light path and the equality of illumination between the two paths is insured by changing the position of a varying light block in the second reference light path. Further, in U.S. Patent No. 2,834,247 the output voltages of the two photocells are opposed and the difference voltage is applied to a servo mechanism. This in turn drives a "cam shaped shutter" in such a manner as to equalize the light incident on the two photocells. In U.S. Patent No. 2,302,554, the outputs of two photocells are balanced against each other by adjusting the intensity of the radiation impinging upon one of the cells. This is accomplished by means of a "circular absorption wedge" positioned in the path of the rays directed to that cell. A colorimetric regulating system is described in U.S. Patent No. 2,066,934 in which a single light source is directed into two beams, one beam passing through a known sample and the other beam passing through an unknown sample. A "symmetrically apertured diaphragm" is rotated in the two light beam paths, so as to alternately interrupt the beams. If the light transmitting quality of one of the samples differs from that of the other, corrective adjustments are made to the unknown sample.

In the above mentioned prior systems, design measures are not taken to stabilize the light sensitive cells, e.g. a cadmium sulfied cell that is subject to fatigue or drift. Consequently, where the unknown sample is constantly changing in the first light path, the output of the photocell in this same path is also changing. Another deficiency of the prior systems is that the range of density measurement has been limited, due to the availability of only one optical light path through the varying light block.

Now in accordance with the present invention it has been discovered that if the unknown sample workpiece is positioned in the light path containing the varying light block, the other light path can be held at a fixed value of reference illumination, regardless of how many times the unknown sample workpiece is changed. Specifically, a closed loop circuit is formed consisting of the lamp, an optical path from the lamp to a light intensity detection means, the detection means output feeding an amplifier and the amplifier feeding back to the filament of the lamp. The amplifier drives the light source and adjusts it for constant illumination on the light intensity detection means. After an initial stabilizing period, the system will be accurate.

It has also been found that if another optical light path is established from the same light source, through the varying light block to the corresponding detection means, and the varying light block contains a separate varying light absorption area for each light path, more light can impinge on the detection means than has been possible heretofore. The result is that the system can measure density over a greater range than has been possible with conventional systems. The term, varying light absorption area, refers to an optical member of varying light absorption qualities, e.g. a wedge-shaped aperture which will pass more light at one end than the other. Density values can be read directly off a calibrated scale on the varying light block.

Accordingly, it is the primary object of this invention to construct a density measuring system of greater stability than has been possible before.

It is another object of this invention to provide an optical density measuring system which has an extended range.

It is another object of this invention to provide an optical density measuring system which is simple to construct, low in cost, and reliable in operation.

It is another object of this invention to provide an optical density measuring system in which the density values can be recorded on a chart recorder, as well as read directly off the varying light block member.

Still another object of this invention is to provide an optical density measuring apparatus having a constant illumination source as the fixed reference illumination.

Figure 1:
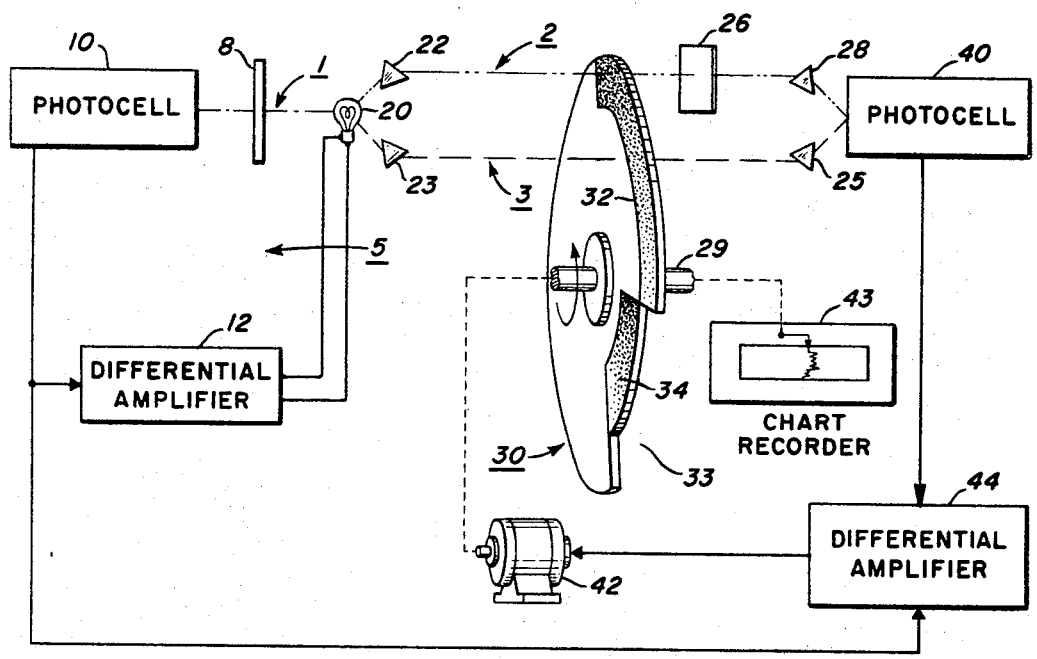
FIG. 1 is a block diagram showing a preferred embodiment of the optical density measuring system.

Referring now generally to the preferred embodiment of FIG. 1, the system contains a constant illumination compensating feedback means or loop circuit 5, consisting of lamp 20, optical filter 8, photocell 10 as a light detection means, and amplifier 12. Optical path 1 is taken as the light path from lamp 20 to photocell 10 and passing through filter 8. Filter 8 is a filter equal to the maximum density value on the varying light block (described hereinafter) and is necessary to furnish the reference illumination on photocell 10. Photocell 10 may be any standard photocell and differential amplifier 12 is a high-gain amplifier with a built in voltage reference level. A very small change in input voltage causes a large change in output voltage.

Varying light block 30 is described hereinafter but basically is made of a disk having outside and inside varying light absorption areas 32, 34, formed thereon to provide variable light interrupting means for optical paths 2 and 3 respectively. Optical path 2 extends from lamp 20, through prism 22, light absorption area 32, the sample workpiece to be measured 26, prism 28, and impinges on photocell light detector 40. Optical path 3 extends from lamp 20, through prism 23, light absorption area 34, prism 25, and also impinges on photocell 40. Photocell 10 and photocell 40 are similar and have differential amplifier 44 connected to their outputs.

Differential amplifier 44 is the comparison means used to drive servo motor 42 which rotates varying light block 30. Differential amplifier 44 is similar to differential amplifier 12.

Referring again specifically to the closed loop of light path 1, filter 8 is to ensure the necessary range of density measurement. To maintain equal illumination on photocells 10 and 40, the density of filter 8 must at all times equal the combination of the density in the optical path or paths through light block 30 and sample 26. Filter 8 is designed to have a density value equal to the maximum density value on varying light absorption areas 32 and 34 on light block 30. In other words, filter 8 offers a reference density against which the light block 30 and sample 26 can be balanced. Filter 8 must be of a density which will pass light in sufficient quantity to maintain a good value of illumination on photocell 10.

In operation of the measuring system the same amount of light must impinge on photocell 10 through light path 1, as impinges on photocell 40 through either light path 2 or the combination of light path 2 and light path 3. In other words, the illumination on photocell 10 and the illumination on photocell 40 are maintained equal at all times. This equality of illumination is determined as follows:

As long as equal amounts of light fall on photocells 10 and 40, their voltage outputs are equal, and differential amplifier 44 does not furnish an output voltage to servo motor 42. If the illumination on photocell 40 becomes greater than the illumination on photocell 10, a difference voltage appears in differential amplifier 44 and a voltage is furnished to servo motor 42. This motor in turn rotates varying light block 30 in a predetermined direction. On the other hand, if the output of photocell 40 is less than that of photocell 10, differential amplifier 44 supplies a voltage of opposite polarity to the servo motor 42, causing it to rotate in an opposite direction. In either case, the servo motor rotates the varying light block 30 in either direction, to a position where the illumination on the photocells is equal.

Light path 2 is used only in conjunction with outside absorption area 32 and light path 3 is used only in conjunction with inside absorption area 34. The orientation of light block 30 inserts the necessary density in light path 2, or in light paths 2 and 3 to provide equal illumination on photocells 10 and 40.

For example, in measuring samples which are almost transparent, light path 2 is the only path used to transmit light to photocell 40. As the samples to be measured become more dense, up to opaque, light path 3 comes into use along with light path 2, to transmit even more light to photocell 40. This process will be described hereinafter in more detail.

Figure 2:
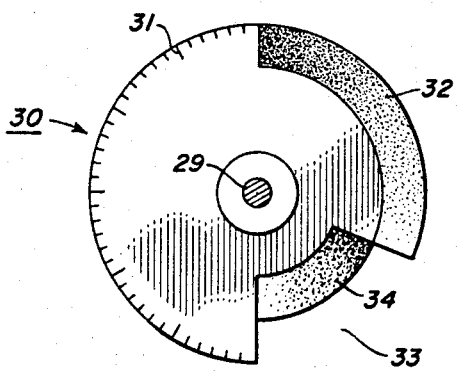
FIG. 2 is a diagram of one embodiment of the varying light block.
Figure 3:
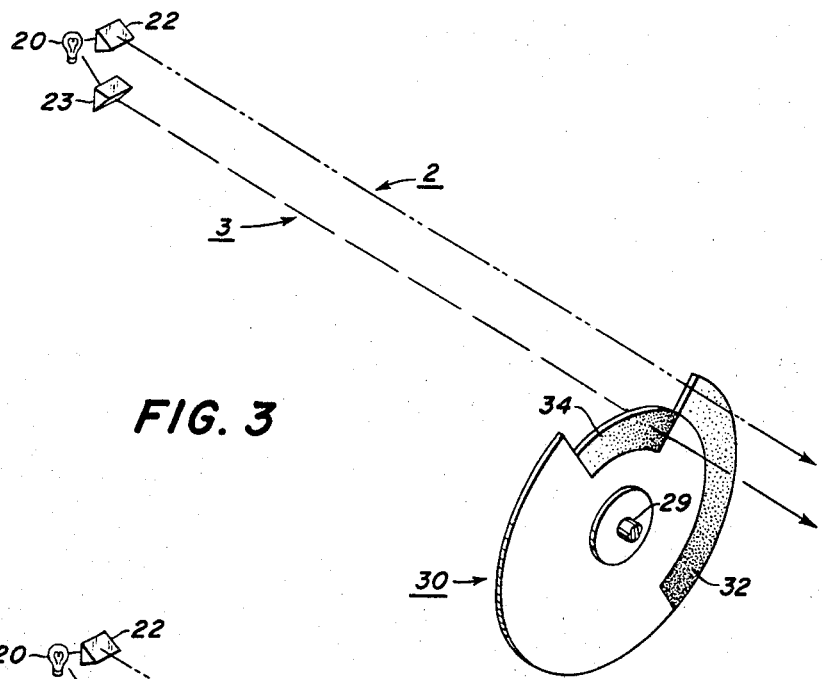
FIG. 3 is a sketch of the varying light block shown in FIG. 2, displaying the light paths.

Referring to the preferred embodiment in FIG. 2, the light block 30 can be made of any material which will effectively hold the outside and inside varying light absorption areas 32 and 34.

Figure 4A:
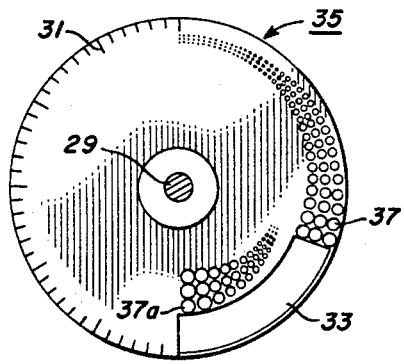
FIG. 4a shows the varying light absorption areas as configurations of small holes, varying in size.
Figure 4:
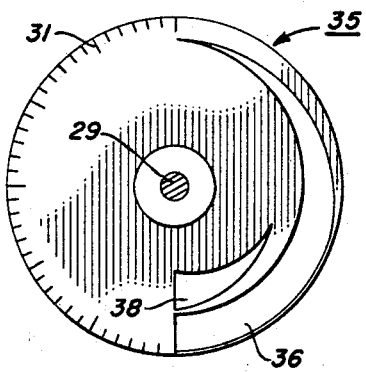
FIG. 4 illustrates a varying light block having wedge-shaped holes cut in a solid piece of opaque material.

In this embodiment, light block 30 is illustrated as a disk shape member having varying light absorption areas 32 and 34. The light block 30 only need be large enough to interrupt light paths 2 and 3. One criterion for the varying light absorption areas is that they must offer a varying absorption to light from some value less than opaque, down to completely transparent. The absorption areas could be an optical member having varying absorption qualities as mentioned. They could also be wedge-shaped holes 36 and 38 cut in a solid piece of opaque material 35 as shown in FIG. 4 with a configuration such that the amount of light passed would vary from one end of the wedge to the other. Any configuration of holes is possible in a solid piece of opaque material that will present a varying absorption pattern; see the holes 37 and 37a illustrated in FIG. 4a.

The outside absorption area 32 must run from something less than opaque, down to transparent. The inside absorption area 34 must be the same and is designed to come into use at the beginning of the transparent area 33 on the outer absorption area 32. The width of each absorption area need only be wide enough to interrupt the corresponding optical path.

The outside absorption area 32 is contained around the circumference of the light block 30 as shown in FIG. 2 and occupies 180° of the circumference. The density values of absorption area 32 range from less than opaque, down to transparent. The inside absorption area 34 is located just inside, the outside absorption area 32, and runs along the edge of the elongated transparent area 33 of outside absorption area 32. The density range of the inside absorption area 34 can or cannot be the same as outside absorption area 32.

The edge of the disk shape light block 30 may be calibrated to provide an indication of the densities of samples tested. Densities may be read directly off the edge, on the scale 31 by measuring the displacement of light block 30 from a normal or reference position. A chart recorder such as 43 may also be mechanically connected to the servo motor shaft 29 to record the optical densities of samples tested.

With no sample workpiece 26 placed in light path 2, light block 30 will be rotated to a position which will place the maximum density position on absorption area 32 in the light path 2. This will permit the same amount of light to impinge on photocell 40 as is impinging on photocell 10. This will insure that the light going from lamp 20 to photocell 10, and the light going from lamp 20 to photocell 40, arrive at both these photocells with equal intensity. At this time, light path 3 is not used.

If a sample workpiece of very light density, almost transparent, is placed into the sample position at 26, the illumination of photocell 40 will decrease slightly because of the introduction of sample workpiece 26. This will create a difference in the voltages being fed from photocells 10 and 40 to differential amplifier 44. Differential amplifier 44 will produce either a positive or a negative output voltage which will operate servo motor 42 to rotate disk shape light block 30 in the necessary direction. Outside absorption area 32 thus will be rotated to a position of a little less density bringing the illumination on photocell 40 to the same intensity as the illumination on photocell 10, again.

When a sample workpiece of even greater density is placed into position 26, even less light impinges on photocell 40, through light path 2. Again, the servo 42 rotates disk shape light block 30 to a position of less density on the outer absorption area 32. Again, the illumination on photocells 10 and 40 is equalized.

If the opaqueness of samples 26 is increased until absorption area 32 has been rotated to its position of transparency 33, the maximum amount of light possible is impinging on photocell 40 through optical light path 2. At this point no additional light can pass through path 2, the limiting factor being the density of sample 26.

When the point of transparency 33 is reached on outside absorption area 32, regardless of how big the opening becomes, only a quantity of light as determined by sample 26 can be focused on photocell 40 through light path 2. However, if at this point inside absorption area 34 is brought into use in optical path 3, more light will be transmitted to photocell 40 than has been heretofore possible. As even more dense samples 26 are placed in light path 2 up to opaque, light path 3 and absorption area 34 come into use, extending the use of the measuring system over a wide range of samples.

In summary, a stable reference voltage has been furnished for differential amplifier 44 coming from photocell 10. The light source 20 has been stabilized by using the loop circuit 5 and amplifier 12. The range of the optical density measuring system has been increased by providing a second new and completely separate light path 3, to photocell 40.

Figure 5:
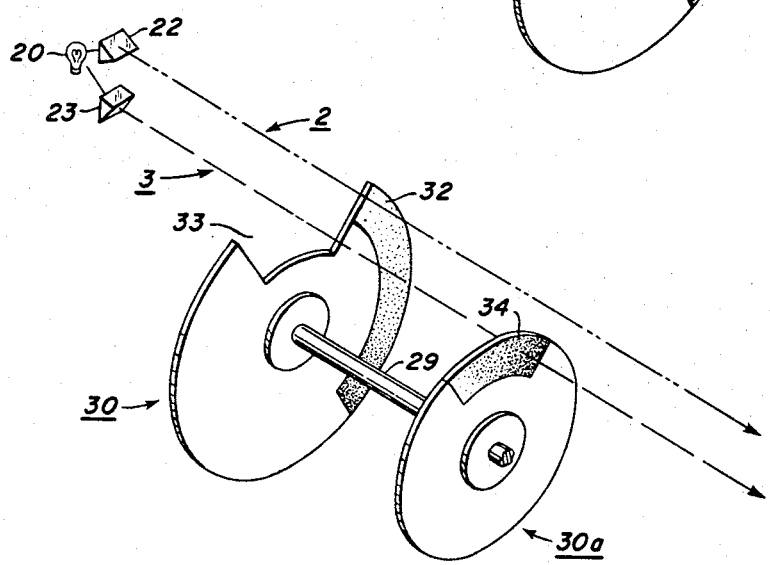
FIG. 5 illustrates the varying light absorption areas on separate light blocks in a sandwiched configuration, one behind the other, on a single shaft.

It is envisioned that numerous changes and modifications may be made in the present system, particularly regarding the physical location and arrangement of the varying light absorption areas 32 and 34. These absorption areas could just as well be constructed on separate disk shape light blocks 30 and 30a. These light blocks could be geared to the servo motor 42 in a manner that would allow absorption area 34 to come into light path 3, when absorption area 32 in light path 2 has rotated to the transparent area 33. These separate disk shape light blocks 30 and 30a could be mounted in a sandwiched configuration, one behind the other, on a single shaft 29, as shown in FIG. 5.

Figure 6:
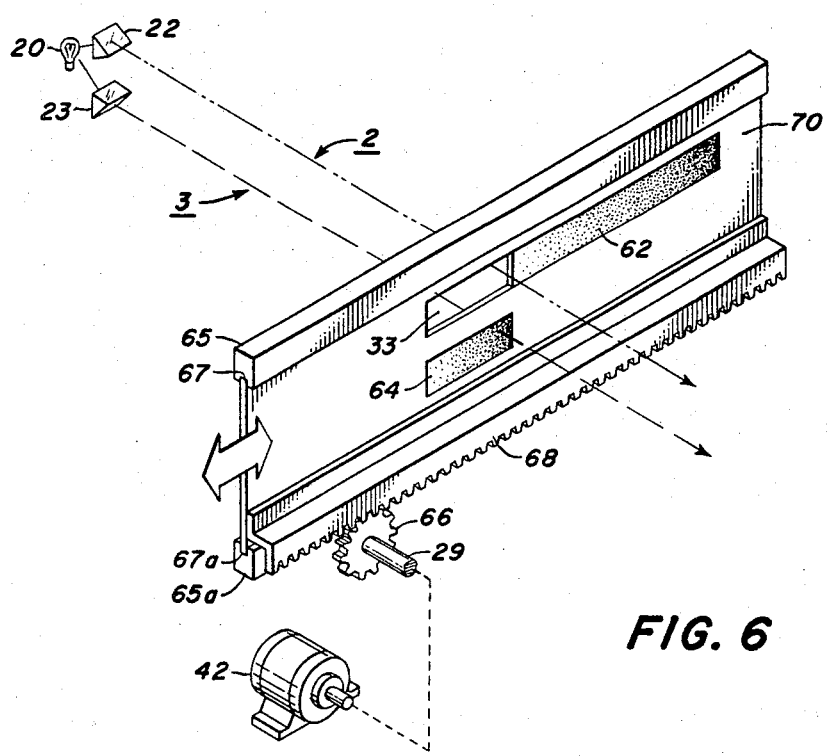
FIG. 6 shows the varying light absorption areas as rectangular strips.

Also, the varying light absorption areas could be rectangular strips 62 and 64, mounted in a sliding panel 70 as illustrated in FIG. 6. Panel 70 may be fastened to rack 68 and is free to move in slots 67 and 67a, along guide rails 65 and 65a. Pinion 66 is attached to shaft 29, which is rotated by servo motor 42.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An optical density measuring system comprising:

a light source, optical filter means disposed from said light source to pass a predetermined quantity of radiation emitted by said source along a first light path, first photosensitive means disposed from said light source along said first light path to receive radiation passed by said filter means and for generating a reference level output signal in response thereto, compensating feedback means responsive to said reference level output signal for maintaining said light source at a constant illumination intensity, second photosensitive means disposed to receive radiation emanating from said light source and to generate a representative electrical output signal in response to the quantity of radiation received, means for directing radiation emanating from said light source along second and third light paths, means for directing radiation from said second and third light paths onto said second photosensitive means, means for supporting a sample having optical characteristics to be measured in one of said second and third light paths to pass a fixed quantity of radiation along said one of said paths in accordance with the optical characteristics of said sample, light blocking means disposed relative to said source and adjustably positioned to regulate the quantity of radiation received by said second photosensitive means, said light blocking means including a first portion optically aligned with said second light path for regulating the quantity of radiation passing through said second light path, and a second portion optically aligned with said third light path for regulating the quantity of radiation passing through said third light path, signal comparison means for sensing a variation in the output level of said second photosensitive means from the output level of said first photosensitive means, drive means operatively connected with said light blocking means and responsive to said signal comparison means for adjustably positioning said light blocking means in said second and third light paths to maintain an illumination intensity at said second photosensitive means equal to the illumination intensity at said first photosensitive means, and indicating means responsive to the positioning of said blocking means relative to said second and third light paths for indicating the optical characteristics of a sample supported in said one of said paths.

2. An optical density measuring system comprising:

a light source, optical filter means disposed from said light source to pass a predetermined quantity of radiation emitted by said source along a first light path, first photosensitive means disposed from said light source along said first light path to receive radiation passed by said filter mean and for generating a reference level output signal in response thereto, compensating feedback means responsive to said reference level output signal for maintaining said light source at a contsant illumination intensity, means for directing radiation emitted by said light source along second and third light paths, second photosensitive means disposed from said light source to receive a combined quantity of radiation passing through said second and third light paths and to generate a representative electrical output signal in response to the quantity of radiation received, means for directing radiation from said second and third light paths onto said second photosensitive means, light blocking means disposed relative to said source and adjustably positioned to pass a variable quantity of radiation along said second and third light paths, said light blocking means including a first portion optically aligned with said second light path for regulating the quantity of radiation passing through said second light path, and a second portion optically aligned with said third light path for regulating the quantity of radiation passing through said third light path, means for supporting a sample having characteristics to be measured in one of said second and third light paths, said sample passing a fixed quantity of radiation along said one of said paths in accordance with the optical characteristics of said sample, signal comparison means for sensing a variation in the output level of said second photosensitive means from the output level of said first photosensitive means, drive means operatively connected with said light blocking means and responsive to said signal comparison means for adjustably positioning said light blocking means in said second and third light paths to maintain an illumination intensity at said second photosensitive means equal to the illumination intensity at said first photosensitive means, and indicating means responsive to the positioning of said blocking means relative to said second and third light paths for indicating the optical characteristics of a sample supported in said one of said paths.

3. Apparatus according to claim 2 further including:

recording means responsive to the positioning of said blocking means relative to said second and third light paths for recording the optical characteristics of a sample supported in said one of said paths.

4. An optical density measuring system comprising:

a light source, optical filter means disposed from said light source to pass a predetermined quantity of radiation emitted by said source along a first light path, first photosensitive means disposed from said light source along said first light path to receive radiation passed by said filter means and for generating a reference level signal in response thereto, compensating feedback means responsive to said reference level signal for maintaining said light source at a constant illumination intensity, first optical means for directing radiation emitted by said light source along second and third light paths, light blocking means disposed from said source to pass a variable quantity of radiation emanating along said second and third light paths, said light blocking means including a first portion optically aligned with said second light path and adjustably positioned relative thereto for regulating the quantity of radiation passing through said second light path, and a second portion optically aligned with said third light path and adjustably positioned relative thereto for regulating the quantity of radiation passing through said third light path, means for supporting a sample having characteristics to be measured in one of said second and third light paths to pass radiation along said one of said paths in accordance with the optical characteristics of said sample, second photosensitive means disposed from said light source to receive a combined quantity of radiation passing through said second and third light paths and generate a representative electrical signal in response thereto, second optical means disposed from said light source in said second and third light paths to receive radiation passing through said sample and said blocking means and for directing the received radiation onto said second photosensitive means, signal comparison means for sensing a variation in the output level of said second photosensitive means from the output level of said first photosensitive means, drive means operatively connected with said light blocking means and responsive to said signal comparison means for adjustably positioning said light blocking means in relation to said second and third light paths wherein the combined quantity of light impinging upon said second photosensitive means is maintained at the same level as the light impinging upon said first photosensitive means, and indicating means responsive to the positioning of said blocking means in said second and third light paths for indicating the optical characteristics of a sample supported in said one of said paths.

References Cited

UNITED STATES PATENTS

| | | |
|---|---|---|
| 1,921,862 | 8/1933 | Bickley. |
| 2,185,690 | 2/1940 | Lang. |
| 2,292,230 | 8/1942 | Lemon. |
| 2,834,247 | 5/1958 | Pickels. |
| 3,060,318 | 10/1962 | Ouvrard. |
| 3,270,348 | 8/1966 | Lesagg et al. |
| 3,319,512 | 5/1967 | Isreeli. |
| 3,328,587 | 6/1967 | Brown et al. |
| 3,340,764 | 9/1967 | Bergson. |

FOREIGN PATENTS

| | | |
|---|---|---|
| 894,581 | 12/1944 | France. |

OTHER REFERENCES

J.S.M.P.E., vol. 49, No. 6 December, 1947, pp. 508–509.

JEWELL H. PEDERSEN, *Primary Examiner.*

W. A. SKLAR, *Assistant Examiner.*

U.S. Cl. X.R.

250—204, 229, 231, 234